United States Patent Office 3,437,645
Patented Apr. 8, 1969

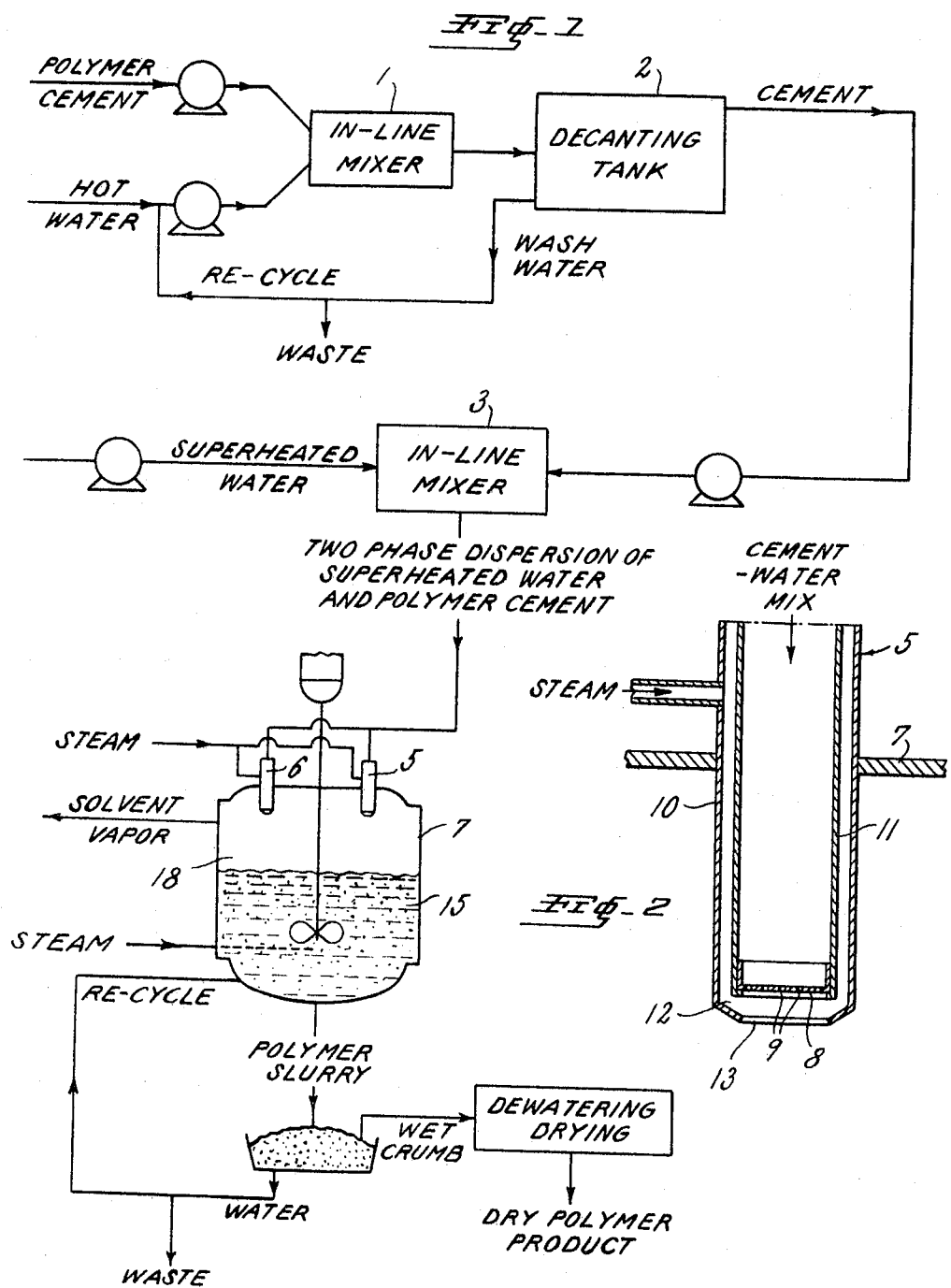

3,437,645
RECOVERY OF RUBBERY POLYMER FROM SOLUTION
John L. Paige, Naugatuck, Conn., and Sebastian M. Di Palma, Baton Rouge, La., assignors to Uniroyal, Inc., a corporation of New Jersey
Filed July 17, 1964, Ser. No. 383,346
Int. Cl. C08f 1/92, 1/88
U.S. Cl. 260—80.78                                       4 Claims

ABSTRACT OF THE DISCLOSURE

Rubbery polymer, such as EPDM, prepared by Ziegler-catalyzed solution polymerization, is recovered from the solution by mixing the solution with superheated water and atomizing the resulting dispersion wtih steam. The atomized spray is directed into a vapor space of a flash tank; the solvent is flashed off and fine polymer particles drop into an agitated body of hot water in the lower part of the tank. The resulting slurry of polymer in water is drawn off from the bottom of the tank, and the polymer particles are separated and dried.

---

This invention relates to a method of recovering olefin polymer rubber from a solution in which it is prepared, and more particularly it relates to a method of removing catalyst residues from such solution and separating the solvent from the rubber with the aid of previously superheated water.

The invention has particular reference to the manufacture, in solution, of polymers of monomers containing at least one olefinic double bond such as copolymers of monoolefins, especially copolymers of ethylene with other alpha-olefins such as propylene, or polymers based on dienes such as butadiene, isoprene or the like, by solution polymerization; a particularly preferred solution—prepared rubber to which the method of the invention is directed is the rubbery copolymer of two or more alpha monoolefins (especially ethylene and propylene) with one or more nonconjugated copolymerizable dienes, whether cyclic or acyclic, such as dicyclopentadiene, methylcyclopentadiene dimer, 1,4-hexadiene, 11-ethyl-1,11-tridecadiene, 1,9-octadecadiene, 1,5-cyclooctadiene or other suitable monomers such as are disclosed in British Patent 880,904 of Dunlop Rubber Company, Oct. 25, 1961; U.S. Patents 2,933,480, Gresham and Hunt, Apr. 19, 1960 and 3,000,866 Tarney, Sept. 19, 1961; and Belgian Patents 623,698 and 623,741 of Montecatini, Feb. 14, 1963; such copolymerizable dienes render the alpha-monoolefin copolymer unsaturated and sulfur-vulcanizable. A particularly vexing problem in connection with the manufacture of such polymers revolves around the treatment of the solution in which the polymer is prepared, particularly for the purposes of removing water-soluble impurities, such as the residues of catalyst, and recovering the water-insoluble polymer from the solution. The problem is complicated by the fact that the solution resulting from the polymerization reaction is typically extremely viscous—it is referred to as a cement—and the polymer tends to be sticky and difficult to handle especially at elevated temperatures and when it still contains some of the solvent in which the polymer is prepared (usually a volatile inert organic solvent [acyclic or cyclic] such as hexane, benzene, dichloroethylene, or the like, or an excess of one or more of the monomers may serve as the solvent). Particular difficulty is encountered as a consequence of a tendency for polymer particles to stick together, when it is attempted to remove the solvent from the polymer, and form large lumps which cannot readily be broken up, leading in turn to difficulties in proper purification and drying of the polymer. The difficulties are compounded by the fact that it is of the greatest importance to remove from the polymer the last traces of catalyst residue (usually the catalyst is based on a transition metal compound such as a halide, usually a vanadium compound such as vanadium oxytrichloride or the like, used along with a cocatalyst such as an organo metallic compound, frequently an organo-aluminum compound, such as an alkyl aluminum halide, e.g., ethyl aluminum sesquichloride)—an extremely difficult feat because of the solubility relationships and the unfavorable physical state of the polymer. Various schemes have been proposed in the prior art for treatment and recovery of the polymer but unfortunately these are frequently subject to various objections and disadvantages, as a consequence of which it has been desired to provide improved treatment and recovery methods.

We are aware of such prior methods as those of U.S. Patent 2,537,130, Green, Jan. 9, 1951 and 2,957,855, McLeod, Oct. 25, 1960 but those methods cannot be satisfactorily applied to the present solutions of rubbery olefin copolymers, in such a way as to achieve the objects and advantages of the present invention, such as will appear hereinafter.

The present invention is based on the discovery that efficient and convenient removal of catalyst residues and recovery of volatile, water-immiscible solvent can be achieved by a method in which the reaction product ("cement") is mixed intimately with superheated water. The catalyst residues pass into the water phase. The mixture or dispersion of superheated water and cement is passed through a fine orifice directly into a stream of steam moving turbulently at a high velocity into the path of the mixture, whereby the mixture is broken up into fine droplets of water and cement surrounded by steam. The thus-atomized particles of water and cement are immediately carried in the steam into a relatively large volume low pressure flashing zone maintained above an agitated body of hot water. The atomized water droplets, containing the dissolved catalyst residue, fall into the agitated body of water. In the flashing zone the solvent vaporizes rapidly from the atomized cement droplets as a consequence of the heat supplied by the superheated water in the mixture and the surrounding steam, and as a consequence of the sudden drop in pressure. The solid particles of rubber fall into the agitated hot water, forming a slurry from which purified solid rubber particles are readily separated, leaving the catalyst residue dissolved in the water. This is believed to be a unique approach particularly from the standpoint of relying upon a swift turbulent current of steam to break up a cement-water dispersion into fine particles, some of which contain the catalyst residue and some of which contain the polymer, and from the standpoint of relying upon the heat capacity of the previously mixed in superheated water to supply a large amount of heat for extremely rapid vaporization of solvent. This approach results directly in convenient and economical achievement of polymer product that is at once catalyst-free and solvent-free, without any tendency to form large lumps that are difficult to handle.

The invention is applicable to the recovery of copolymers of ethylene, propylene and higher alpha-olefins as well as homopolymers of diolefins such as butadiene, isoprene, etc. Particularly preferred copolymers further include, in addition to at least two alpha-monoolefins, at least one copolymerizable diene such as dicyclopentadiene, hexadiene, cyclooctadiene, or the like, as described previously. The copolymers are made, at moderate temperatures and pressures, with the air of coordination catalysts (e.g. transition metal compound plus a reducing or complexing agent) in solution in an organic solvent. Solvents used for this purpose include aliphatic, cycloaliphatic and aromatic, and may be hydrocarbons or substituted (e.g. halogenated) hydrocarbons such as hexane, dichloroethylene, benzene, and the like.

The invention will be described with reference to the accompanying drawing, wherein:

FIG. 1 is a flow diagram representing one method of practicing the invention; and, FIG. 2 is a fragmentary enlarged sectional elevational view of a dual spray atomizer used in the invention.

Referring to the drawing, the form of the invention shown therein involves passing the cement, that is, the solution of polymer as it comes from the polymerization vessel (after flashing off unreacted monomers), into an in-line mixer 1. This cement or polymer solution may be prepared, for example, by polymerizing ethylene, propylene and dicyclopentadiene in hexane, using vanadium oxytrichloride-ethyl aluminum sesquichloride catalyst, as described in Belgian Patent 622,040, Sept. 3, 1962, United States Rubber Company, or copending application Ser. No. 383,329 filed by us of even date herewith. The cement as it passes into the mixer is at its normal ambient temperature after the unreacted monomer flashing operation, for example, about 100–130° F. Frequently the cement at this point contains about 80 to 95% by weight of volatile solvent, and correspondingly about 20 to 50% of polymer. It is extremely viscous, as exemplified by a viscosity of 500 to 1,000,000 centipoises at 77° F. It will be appreciated that such a material as this is difficult to handle and in particular it is extremely difficult to effect efficient heat transfer with such a viscous cement because of the highly unfavorable heat transfer coefficient. The cement contains catalyst residue, in amount of, e.g., 0.1 to 10% on the weight of the polymer, and it is of the greatest importance that the catalyst residue be removed as thoroughly as possible. Preliminary wash water, heated if desired to a temperature somewhat higher than the temperature of the cement, for example, at a temperature of from 100° F. to 250° F., is simultaneously introduced to the in-line mixer 1 thus producing a mixture having a temperature of 100° F.–200° F. The higher the ratio of wash water to cement the more complete is the catalyst removal. It may be mentioned by way of non-limiting example that the ratio of water to cement at this stage may typically be in the range of from about 1:10 to 10:1, by weight.

The resulting water-cement mixture from the in-line mixer 1 passes next into a decanting tank 2, where the water and cement separate spontaneously by gravity. It will be understood that under the conditions of the water-cement mixing there is no stable emulsion formed, so that ready separation into two phases takes place in the decanting tank 2. The polymer of course remains in solution in the solvent. The wash water, containing a portion of the catalyst residue, is drawn off from the tank 2. Typically a large part (at least about half, preferably about 90%) of the wash water is recycled to conserve heat, while the remainder is discarded to prevent catalyst residue build-up in the wash water.

It will be appreciated that the just-described preliminary washing is optional and its purpose is merely to remove a portion of the catalyst residue; the final purification from catalyst residue takes place in the next stages, to be described. The degree of removal of catalyst residue is conveniently expressed in terms of the ash content of the polymer. Thus, the ash content of the initial polymer cement before this preliminary washing might typically be about 0.1 to 10%, based on the weight of the polymer, whereas after this preliminary washing step the polymer might have for example 0.05 to 5% ash indicating a need for further purification even though there has been some decerase of ash in the preliminary washing.

After passing from the decanting tank 2 the cement, in accordance with the invention, is combined with superheated water. For this purpose the cement, typically at a temperature of 100–200° F is introduced to another in-line mixer 3, to which water, superheated to a temperature of, for example, 225–350° F., is also introduced. In this way the temperature of the water-cement dispersion is 160–200° F. The ratio of superheated water may vary, for example, from about 1:10 to about 10:1. The resulting mixed stream is a two-phase intimate mixture of solvent containing the dissolved polymer, and superheated water; the polymer of course remains in solution. The mixture is nearly a true emulsion, but is not a permanent dispersion; if allowed to stand quiet in most cases it would take several minutes for separation into layers to begin.

The two-phase superheated stream is led under pressure (e.g. 10 to 600 p.s.i.g. [pounds for square inch gauge]) into one or more two-fluid atomizing nozzles 5, 6 which discharge the dispersion directly into a flash floc tank 7. Each two-fluid atomizing nozzle includes an orifice plate 8 (FIG. 2) having one or more small orifices 9 through which the cement-water mix is fed so as to form rapidly moving fine streams. Steam at higher pressure than that in the flash floc tank 7 is introduced into an annular jacket 10 surrounding the central pipe 11 which carries the cement-water mix. The steam jacket 10 is constricted inwardly toward the central pipe 11 at the orifice plate 8, thus forming an annular restricted passage 12 which terminates in a central common orifice 13. The pressure drop of the cement, water, steam mixture as it emerges through the common orifice 13 provides an intense turbulence and exerts highly effective shearing forces on the streams of polymer-water dispersion emerging from the fine orifices 9, thus breaking up the dispersion into innumerable fine particles of water and cement. The thus atomized spray sweeps from orifice 13 at the end of the steam jacket into the atmosphere of the flash floc tank 7.

The flash floc tank contains a body 15 of intensely agitated hot water maintained at a temperature just below the boiling point of water, say 190°–210° F. (for example by sparging steam into the water) and above the water there is a vapor space 18 maintained at a pressure considerably below the pressure at which the superheated two-phase cement-water stream is advanced. Typically the vapor space may be at 0–10 p.s.i.g. pressure. As the cement-water spray emerges from the atomizing nozzle the solvent immediately flashes off from the cement particles as a consequence of the reduction in pressure while the water particles fall into the body of agitated hot water 15. The heat of vaporization for the solvent is supplied not only by the superheated water in the cement-water dispersion but also by the steam introduced in the jacket 10 at the nozzle.

The solid polymer particles which fall into the water in the flash floc tank have the form of a crumb, typically of 1/16" to 3/8" size. It is desired to emphasize that without introducing steam in the atomizing nozzle as described crumb particle formation is erratic and much larger size particles, such as agglomerates one inch in diameter, are readily formed. When this happens solvent separation becomes inefficient, as well as catalyst removal, and the polymer has poor handling characteristics. In addition such large particles often contain entrapped vapors resulting in a massing of particles at the surface of the water in the tank, where they stick together and prevent proper operation of the process. In contrast, the use of steam atomization in a dual nozzle as described effects a finer, reproducible particle size. The result is more efficient solvent evaporation and catalyst removal and better handling characteristics of the crumb slurry.

The resulting slurry is pumped out of the flash floc tank, and the water containing the catalyst residue is drawn off, leaving the solid polymer crumb behind. The polymer as a result of this treatment is remarkably free from catalyst, and typically has an ash content of only about 0 to 0.5%, indicating that nearly all of the catalyst residue has been removed by the treatment of the invention, for all practical purposes.

If desired, the final polymer may optionally be reslurried in water for a final rinse, and after draining off the water the polymer may finally be dried by any suitable conventional method, using for example extruder driers, Banbury driers, or any other devices.

It will be understood that other ingredients may be added to the polymer cement in known manner at appropriate stages, such as carbon black or oil-extenders, antioxidants or stabilizers, and the like.

It is desired to emphasize that a particularly remarkable feature of the invention resides in the manner in which the heat of vaporization for the solvent is supplied in large part by superheated water mixed directly into the cement. This avoids the difficult problem of trying to supply heat to such a viscous material in any kind of heat exchanger, which is slow, cumbersome, and inefficient and is also extremely subject to fouling by precipitated polymer. The cement-water mix is virtually an oil-in-water emulsion; water seems to improve greatly the mobility of the cement.

Another remarkable feature of the invention resides in the direct spraying or flashing of the two-phase superheated water-cement mix without any separation of the water prior to the spraying, while still obtaining remarkably efficient removal of catalyst from the polymer, as described.

An important feature of the invention resides in the use of steam jacketing at the dual spray atomizing nozzle to supply additional heat to the cement, as well as the manner in which the steam effects formation of fine particles of cement of reproducible size which lead to polymer crumbs of easily manageable size that can be efficiently processed as described.

The following example is given for the purpose of illustrating various typical details in the practice of the invention, based on the composite experience of a number of trials.

Example

A typical cement is a solution of an ethylene(60%)-propylene(34%)-dicyclopentadiene(6%)terpolymer in n-hexane, containing 15% by weight of the polymer, made in a conventional manner using a soluble catalyst consisting of ethyl aluminum sesquichloride and vanadium oxytrichloride (aluminum to vanadium ratio 10:1). The ash content is 3%, indicating that substantial catalyst residues are present.

The cement at a temperature of 110° F. is given an optional preliminary wash by mixing with an equal weight of hot water at a temperature of 200° F. and the water is decanted off. Ash content in this way is reduced to 1%, for example, indicating partial removal of catalyst residues.

The washed cement at 150° F. is thoroughly dispersed in an equal weight of superheated water at a temperature of 250° F. The two-phase dispersion (one phase water and the other phase polymer dissolved in n-hexane) is advanced through a steam jacketed dual spray nozzle. The temperature of the dispersion is about 200° F. The steam (temperature about 275° F., 30 p.i.s.g.) supplies additional heat as the dispersion passes to the atomizing nozzle. As the dispersion emerges from fine openings about ⅛″ in diameter in the spray nozzle the turbulent steam current breaks it up into fine particles of water and polymer solution. This atomizing is performed directly into the atmosphere of a flash floc tank wherein the pressure is about 5 p.s.i.g. The solvent flashes off; fine solid polymer particles, agglomerated to crumbs of about ¼″ size, are deposited in agitated hot water (200° F.) in the flash floc tank. The water particles in the atomized spray, which contain the catalyst residues, drop into the water in the tank. The slurry is drawn out of the tank, filtered, and dewatered; the final dry polymer has very little if any ash content.

Having thus described our invention, what we claim and desire to protect by Letters Patent is:

1. A method of recovering a solid rubbery polymer of at least one olefinically unsaturated monomer from a solution, in an inert organic solvent that is insoluble in water, in which the polymer is prepared and removing water-soluble catalyst residue from said rubbery polymer comprising:
   (a) mixing the polymer solution with super-heated water to form a two-phase temporary dispersion in which the said catalyst residue is extracted from the polymer solution phase into the water phase;
   (b) passing the two-phase dispersion under pressure into an atomizing nozzle in which a turbulent high velocity steam jet breaks the dispersion up into a fine spray;
   (c) the said spray being directed into a low pressure vapor space wherein the solvent volatilizes leaving behind solid particles of rubbery polymer and droplets of water containing the said dissolved catalyst residue;
   (d) the said vapor space being above an agitated body of hot water into which said solid particles of rubbery polymer and droplets of water fall;
   (e) separating the resulting substantially catalyst-residue-free solid particles of rubbery polymer from the body of water containing dissolved catalyst residue; and
   (f) thereafter drying the polymer particles, the said two-phase dispersion being first conducted, in the said atomizing nozzle, through a central pipe surrounded by an outer concentric jacket through which the said steam is conducted, the steam thereby adding heat to the dispersion, the dispersion thereafter emerging through a plurality of orifices at the termination of said central pipe to form a plurality of rapidly moving fine streams, the said stream in the outer concentric jacket thereafter being directed, with the plurality of rapidly moving fine streams of the dispersion, into a common exit orifice to produce an intense turbulence and exert shearing forces on the streams of dispersion as the resulting spray enters the said vapor space.

2. A method as in claim 1, in which the said rubbery polymer is a terpolymer of ethylene, another alpha-monoolefin, and a copolymerizable non-conjugated diene.

3. A method as in claim 1, in which the said solvent is n-hexane.

4. A method as in claim 1 in which, in step (a), the ratio of superheated water to polymer solution is from 1:10 to 10:1 by weight, and the temperature of the resulting dispersion is from 160° to 200° F., the pressure of the dispersion as it is fed into the said atomizing nozzle being from 10 to 600 p.s.i.g., and the temperature of the agitated body of water in step (d) being from 190° to 120° F.

References Cited

UNITED STATES PATENTS

| 3,320,220 | 5/1967 | Di Drusco et al. | 260—80.5 |
| 2,537,130 | 1/1951 | Green | 260—96 |
| 3,241,600 | 3/1966 | Whitehouse | 260—94.7 |
| 3,287,301 | 11/1966 | Fysh et al. | 260—23.7 |

FOREIGN PATENTS

| 668,693 | 8/1963 | Canada. |

JOSEPH L. SCHOFER, Primary Examiner.
WILLIAM F. HAMROCK, Assistant Examiner.

U.S. Cl. X.R.

260—88.2, 94.7, 94.9, 96

UNITED STATES PATENT OFFICE
CERTIFICATE OF CORRECTION

Patent No. 3,437,645        Dated April 8, 1969

Inventor(s) John L. Paige et al

It is certified that error appears in the above-identified patent and that said Letters Patent are hereby corrected as shown below:

Column 6, line 59, change "120°F." to --210°F.--.

SIGNED AND
SEALED

AUG 26 1969

(SEAL)
Attest:

Edward M. Fletcher, Jr.
Attesting Officer

WILLIAM E. SCHUYLER, JR.
Commissioner of Patents